(12) United States Patent
Beckett et al.

(10) Patent No.: US 6,444,044 B1
(45) Date of Patent: Sep. 3, 2002

(54) CRYSTALLIZATION OF SUGARS

(75) Inventors: Stephen Thomas Beckett, Wigginton; Marina Miller, Uxbridge; Susan Grimes, Uxbridge; John Donaldson, Uxbridge, all of (GB)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 09/525,004

(22) Filed: Mar. 14, 2000

Related U.S. Application Data

(63) Continuation-in-part of application No. PCT/EP98/05866, filed on Dec. 9, 1998.

(30) Foreign Application Priority Data

Sep. 15, 1997 (GB) .............................................. 9719601

(51) Int. Cl.[7] .............................. C13F 1/02; A23G 3/00
(52) U.S. Cl. ............................. 127/58; 127/30; 127/31; 127/61; 426/103; 426/237; 426/631; 426/660
(58) Field of Search ............................. 127/30, 31, 58, 127/61; 426/103, 237, 631, 660

(56) References Cited

FOREIGN PATENT DOCUMENTS

EP    0 333 892 A1    9/1989

OTHER PUBLICATIONS

Zharova et al, Effect of a magnetic field on the formation of crystallization centers of hydrated glucose, AN 1968:90517, 1968.*

F. Cole et al., "Benefits of permanent magnets un factory evaporation", International Sugar Journal, vol. 98, No. 1166, pp 71–72. (1996) No month provided.

Z. Bisheng et al., "Magnetic fields and the evaporation rate of sugar solutions" International Sugar Journal, vol. 98, No. 1166, pp. 73–75. (1996) No month provided.

S. Guo et al., "Study on the effect of magnetic treatment on sucrose crystallization" Chemical Abstract XP–002090986, vol. 122, No. 8, p. 155, col. 1. (1995) No month provided.

A.G. Gasparyants et al. "Mass crystallization from solutions" FSTA/IFIS XP002090985 (1975) Chemical abstract—XP002090987 No month provided.

* cited by examiner

*Primary Examiner*—David Brunsman
(74) *Attorney, Agent, or Firm*—Winston & Strawn

(57) ABSTRACT

A process for preparing crystalline sugar by providing a solution of a solvent and sugar, exposing the solution to a magnetic field having a strength which is sufficient to impart improvements in the processing of the sugar or the properties of the resulting crystalline sugar product, and providing conditions suitable for crystallization to obtain a substantially crystalline sugar product. The magnetic field strength is sufficient to influence at least one of morphology, size, nucleation rate or, crystallinity of the crystalline sugar product.

18 Claims, 12 Drawing Sheets

CRYSTALLIZATION OF SUGARS

CROSS-REFERENCE TO RELATED APPLICATION

This application is a continuation-in-part of International Application No. PCT/EP98/05866 filed Dec. 9, 1998 the content of which is expressly incorporated herein.

FIELD OF THE INVENTION

The present invention relates to the crystallization of sugars and to sugar crystals obtained thereby.

BACKGROUND ART

Sugars such as sucrose are very widely used, such as in the food and confectionery industries, and the final stage in the manufacturing process of the sugar is often crystallization from an aqueous solution with the sugar then being used in crystalline form. Crystallization of sugars is a complex process which is difficult to control so that the size and shape of the resulting sugar crystals is often unpredictable. Where crystals of a particular size and shape are required, for example in certain applications in the confectionery industry, it is difficult to produce crystals in the required form conveniently and consistently.

Sucrose generally crystallizes in anhydrous form although the formation of the hemipentahydrate ($C_{12}H_{22}O_{11} \cdot 2.5H_2O$) and the hemiheptahydrate ($C_{12}H_{22}O_{11} \cdot 3.5H_2O$) has been reported on crystallization at low temperature (−34° C.) (Young & Jones, J. Phys. Colloid Chem., 53, 1334–1350, 1949). The formation of the crystalline hydrates was regarded as a problem in the storage of frozen fruits and investigations were undertaken to try to find ways of preventing their formation (Young et al, Food Research, 16, 20–29 1951).

Engelsen and Pérez (Carbohydrate Res. 292, 21–38, 1996) suggested on the basis of molecular dynamics simulation (a computer modeling technique) and crystallographic investigation of a sucrose/protein complex that sucrose may exist in hydrated form in aqueous solution but these conclusions remain controversial.

Research into the effects of magnetic fields on chemical processes has been sporadic. It was suggested in the 1930s that application of a magnetic field could remove scale from water pipes but in the absence of a convincing rationale for the effect the technique remained controversial for many years before being confirmed experimentally some 50 years later (Donaldson, Tube International, January 1988, 39 and Grimes, Tube International, March 1988, 111). The effect of magnetic fields on precipitation and crystallization in inorganic systems such as calcium carbonate and zinc phosphate is assumed to be on nucleation and coagulation and the effect in reducing scale formation or even removing scale which has already formed appears to be a result of changes in solubility of the inorganic compound.

In the case of organic molecules, it was found that when benzophenone was crystallized in a high magnetic field, the direction of the long axis of the needles formed tended to align perpendicular to the direction of the magnetic field (Katsuki et al, Chemistry Letters, 1996 607–608). With a more complex organic molecule, a considerable degree of alignment was found when fibrin was allowed to polymerize in a magnetic field and a possible effect on blood clotting in vivo was suggested (Yamagishi et al, J. Phys. Soc. Jpn., 58(7), 2280–2283, 1989). A recent report has also suggested that application of a magnetic field can influence the selectivity ratios in the nickel catalyzed hydrogenation of fats such as sesame oil and soybean oil (Jart, JAOCS, 75(4), 615–617, 1997).

Experiments have been reported in which passing sucrose solution through a magnetic field appeared to reduce the boiling point of the solution although a drop in boiling point was also noted for distilled water and tap water. The magnetic field also affected viscosity and surface tension of the sucrose solution but the various effects were not proportional to the intensity of the magnetic field (Bisheng et al., Int. Sugar Journal, 98, 73–75, 1996). It has also been suggested that the application of a magnetic field can reduce and control evaporator scale in the production of cane sugar (Cole & Clarke, Int. Sugar Journal., 98, 71–72, 1996). There is no suggestion in either of these papers of any effect on the sucrose crystals themselves.

The present invention relates to a method by which the crystallization of sugars can be influenced so that a particular desired crystalline product can be formed conveniently and consistently.

SUMMARY OF THE INVENTION

The present invention relates to process for preparing crystalline sugar, the process comprising providing a solution comprising a solvent and sugar, exposing the solution to a magnetic field having a strength which is sufficient to impart improvements in the processing of the sugar or the properties of the resulting crystalline sugar product, and providing conditions suitable for crystallization to obtain a substantially crystalline sugar product.

The sugar is typically sucrose, glucose, fructose, trehalose, lactose, sorbitol, mannitol, erythritol, or combination thereof. In a preferred embodiment, the sugar consists essentially of sucrose or lactose. In another embodiment of the invention, the solvent is water and the crystalline sugar comprises sucrose hydrate containing more than about 1% water by weight. In yet another embodiment of the invention, the sugar consists essentially of lactose and water in a higher amount than known in the art.

Preferably, the strength of the magnetic field is sufficient to influence at least one of a morphology, size, nucleation rate, crystallinity, or combination thereof of the crystalline sugar product. In a preferred embodiment, the solution is exposed to a magnetic field from at least one permanent magnet during the exposing step, which magnet provides a magnetic field strength of at least about 200 G. Alternatively, the solution is exposed to a magnetic field from at least one DC electromagnet during the exposing step, which magnet provides a magnetic field strength of at least about 30 G. In another embodiment of the invention, the process comprises using at least one pulsed magnet.

In the process according to the invention, at least a portion of the solution is preferably exposed to the magnetic field while evaporating an amount of solvent sufficient to the crystallization of the sugar. Thus, at least a portion of the solution is preferably maintained at a temperature of from about 30 to about 70 ° C. while evaporating at least a portion of the solvent.

Another embodiment of the invention relates to food and confectionary products prepared with the crystalline sugar products disclosed herein as an ingredient or coating.

BRIEF DESCRIPTION OF THE DRAWINGS

Preferred embodiments of the invention are illustrated in the appended drawing figures, wherein.

DETAILED DESCRIPTION OF THE PREFERRED EMBODIMENT

Figure 1:
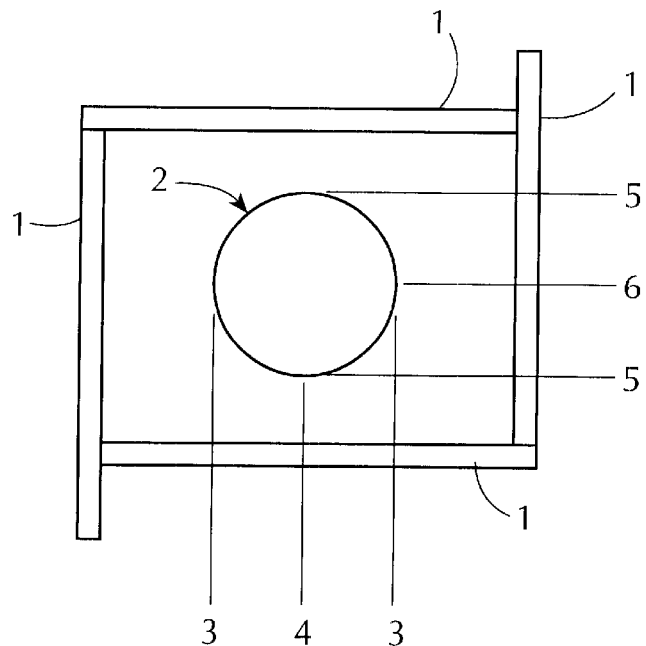
FIG. 1 shows the orientation of the magnetic field referred to under 1.1(c) below.

Herein, the term "sugar" is used generally to refer, for example, to any monosaccharide, disaccharide, oligo-saccharide, sugar alcohol, or combination thereof that will combine to form a substantially crystalline sugar product. Polyols obtained by reduction of the corresponding sugar may also be used. In one embodiment of the invention, the sugar comprises any substantially water soluble monosaccharide, disaccharide, oligo-saccharide, sugar alcohol, or combination thereof. For example, sugars such as sucrose, glucose, fructose, trehalose, lactose, sorbitol, mannitol, erythritol, or combination thereof may be used. In one embodiment, the sugar consists essentially of lactose. In a preferred embodiment, the sugar consists essentially of sucrose, and the solvent is water.

The solvent may comprise any solvent or mixture of solvents so long as an amount of sugar sufficient to allow for crystallization is soluble therein when the solvent is at a desired temperature. The process of the present invention may be used with sugar syrups that are known in art. In a preferred embodiment, the solvent is water. In a more preferred embodiment the solvent comprises deionized water.

The solvent may also be a solution of water and at least one alcohol. Alternatively, the solvent may be an organic solution of an alcohol or a mixture of two or more alcohols.

The sugar solution is preferably undersaturated. In a preferred embodiment the sugar solution is between about 1 and 35% undersaturated, i.e., between about 99 and 65% saturated. In a more preferred embodiment, the solution is between about 10 to 30%, and more preferably about 20%, undersaturated, i.e., between about 90 to 70%, and more preferably about 80% saturated. However, the present invention may also be used with solutions that are provided saturated or that become saturated during crystallization, provided that seed crystals are not present when the magnetic field is applied. Or, the temperature may be raised or lowered during crystallization to, for example, increase or decrease a rate of solvent evaporation.

It is understood in the art that the degree of saturation depends on, among other parameters, the temperature of the solution and the sugar. For example, in one embodiment of the invention, the temperature of the solution during at least a portion of the process is from about 30 to about 70° C. and the solution comprises from about 20 to about 95% sugar and about 80 to about 5% water based on the total weight of the solution. In a still more preferred embodiment, the temperature of the solution is from about 30 to about 70° C. during at least a portion of the crystallization and the solution comprises from about 20 to 75% and preferably 20 to 40% sucrose and about 80 to 25%, and preferably 80 to 60% water based on the total weight of the solution. In a most preferred embodiment, the temperature of the solution is about 50° C. during at least a portion of the crystallization and the solution comprises about 33% sucrose and about 67% water based on the total weight of the solution.

It is understood in the art that crystallization comprises complex processes leading to the growth and recovery of crystals from a solution comprising molecules suitable for crystal growth. Crystallization comprises, but is not limited to, processes such as, nucleation, crystal growth, attrition, agglomeration, and maturation of crystals. Crystallization is usually initiated by evaporating at least a portion of the solvent. However, other methods such as agitation or seeding, as are understood in the art, can be used alone or in combination with evaporation in the process of the present invention. Once crystallization has proceeded for a desired length of time or when substantially all or most of the solvent has evaporated, the crystalline sugar of the present invention can be recovered and dried by methods known in the art. Preferably, the recovered, dried crystals have properties desirably associated with sugar such, for example, as a predetermined pourability, morphology, or crystallinity, as can be determined using methods known in the art.

In general, crystallization is induced by allowing at least a portion of the solvent to evaporate. In a preferred embodiment, a sufficient amount of solvent evaporates to allow recovery of sugar having desired properties such as, for example, pourability and crystallinity. In a more preferred embodiment substantially all of the solvent evaporates during crystallization. Recovery of crystalline sugar may further comprise such steps as, for example, drying which are understood.

During crystallization, fans or other devices may be used to circulate air or other gas above the solution to urge evaporation of the solvent. Also, the relative humidity of the air or other gas, such as solvent vapor, in contact with the solution may be varied to adjust the rate of evaporation and/or crystallization. During crystallization, the relative humidity of the gas contacting the solution is preferably less than about 100%, more preferably less than about 75%.

During at least a portion of crystallization, the temperature of at least a portion of the solution is preferably from about 10 to 100° C., although the crystallization can be carried out at from about the lowest temperature at which the solvent evaporates up to the boiling point. In a preferred embodiment, during at least a portion of the crystallization, the temperature of at least a portion of the solution is preferably about 30 to 70° C.; for example, most preferably, for example, about 50° C.

In one embodiment of the invention, at least a portion of the solution is maintained at substantially the same temperature during substantially all of the crystallization step. In another embodiment, the temperature of at least a portion of the solution may be sequentially decreased as crystallization proceeds. Such temperature variations allow the rate of evaporation and/or crystallization to be adjusted as needed. It is also possible to vary the pressure of the air or other gas contacting the solution to adjust the solvent boiling point to a predetermined temperature.

Seed crystals may be added to the solution. In a preferred embodiment, the seed crystals represent, at least in part, a crystalline product obtained by the presently recited process and recycled in a subsequent crystallization process.

Crystalline sugar obtainable by the present process preferably comprises at least one hydrated form of the sugar, crystalline other hydrates, hydrate or combination thereof. A portion of the crystalline sugar prepared according to the invention may comprise anhydrous sugar, however, the present method advantageously allows the preparation of crystalline sugar comprising a larger amount of water than sugar prepared by methods known in the art. Herein, the terms hydrated form, hydrate, or crystalline hydrate mean sugar comprising extra water which may be tightly bound but is detectable by, for example, Karl Fischer titration or differential scanning calorimetry (DSC). Thus, for example, the hydrated form, hydrate, or crystalline hydrate of sugar obtainable by the process of the invention may preferably comprise water molecules incorporated into the sugar crystal lattice and are tightly held within the molecular structure of the sugar. For example, the hydrate of the invention may preferably be distinguished using DSC from sugar consisting substantially of anhydrous sugar or sugar prepared without exposure to a sufficiently strong magnetic field. Additionally, water inclusions or surface water may be present. In a preferred embodiment, the sugar prepared by the process of the invention comprises sucrose hydrate and further comprises at least about 1% water by weight, and more preferably at least about 10% water by weight.

The sucrose hydrate prepared by the process of the invention, preferably comprises sucrose hemi-pentahydrate, sucrose hemi-heptahydrate, or a combination thereof. The sucrose hydrate preferably exhibits a peak at about 150° C. using DSC. In a more preferred embodiment the ratio of the peak at about 150° C. to a peak at about 180° C. is at least about 0.3.

In one embodiment, the sugar comprising sucrose hydrate is crystallized from an aqueous solution having a temperature of at least about 0° C. about to the boiling point of the solution during at least a portion of the crystallization; for example, preferably the solution has a temperature of from about 30 to 60° C., most preferred the temperature is about 50° C.

In another embodiment, the sugar obtained by the process of the present invention comprises α-lactose hydrate. In a preferred embodiment the crystalline sugar comprising α-lactose hydrate further comprises at least about 7% water by weight. In a still more preferred embodiment, the crystal comprising α-lactose hydrate further comprises at least about 9% water by weight.

According to the invention, the solution is exposed to a magnetic field having strength sufficient to influence at least one of a morphology, size, nucleation rate, crystallinity, or combination thereof of the crystalline sugar. In particular, the size and/or shape of the crystals produced according to the invention can be influenced as desired. Once the particular type and orientation of magnetic field and the manner of its application which leads to crystals with the desired properties (size, shape, etc.,) has been determined, then application of that field enables the desired crystals to be produced subsequently with a high degree of consistency.

In yet another embodiment of the invention, crystalline sucrose obtained by the process of the invention comprises crystals at least about 100 µm, for example, preferably at least about 500 µm, and, most preferably, at least about 1000 µm. In another embodiment of the present invention, the sugar crystals are preferably substantially microcrystalline, for example, smaller than about 40 µm or, more preferably, smaller than about 25 µm. In a preferred embodiment of any of the above crystals, the crystals are substantially rectangular or wedge shaped.

Preferably, the solution is exposed to a magnetic field that is stronger than the magnetic field of the earth, which is about 0.5 Gauss ("G"). The upper limit is not critical but the invention is operable at relatively low levels of up to 1000 G. Thus a magnetic field of at least 1 G, preferably at least 10 and more preferably at least 25 G is used. Any type of magnet or combination of magnets can be used to apply this magnetic field. For example, the magnets may include permanent magnets, electromagnets such as, for example, pulsed electromagnets and DC electromagnets, or combination thereof. A pulsed or alternating magnet is a magnet capable of applying a magnetic field that varies in time. Radio frequency generated magnetic fields may used alone or in combination with any of the permanent or electromagnets above. The magnetic field may comprise a single magnetic field or a superposition of magnetic fields. The superposition of magnetic fields may comprise a constant and an alternating magnetic field. The present invention does not require that the magnetic field have a substantially homogenous strength throughout the entire solution.

The effect of different types of magnetic fields is discussed in more detail in the experimental work described below. However, in general terms, DC electromagnetic fields promote euhedral growth (more rectangular crystal form) and also slow the crystal growth whereas the number of centers of growth (nucleation) increases with increasing field strength. Thus, for example, a DC electromagnetic field may preferably be used to obtain a large quantity of regular crystals with a fine particle size, because preparation of such crystals requires a process which promotes nucleation more than crystal growth. In general, permanent magnetic fields reduce the number of centers of growth with increasing field strength.

In an embodiment of the invention, at least a portion of the solution is exposed to a magnetic field from at least one permanent magnet, which provides a magnetic field strength of at least about 50 G, preferably at least about 200 G, and more preferably at least about 450 G, and most preferably at least about 600 G. In a preferred embodiment, at least a portion of the solution is disposed between at least a portion of two substantially opposed electromagnets during the applying magnetic field step. However, the magnets may also be arranged in any geometry so as to expose at least a portion of the solution to a superposition of magnetic fields.

At least one DC electromagnet may be used to apply a magnetic field to the solution. In a preferred embodiment at least two DC electromagnets are disposed on at least two opposed sides of at least a portion of the solution. The magnetic field applied by the DC electromagnets is at least about 30 G in at least a portion of the solution, preferably at least about 150 G, more preferably at least about 400 G. The nucleation exposure of the solution to a DC electromagnetic field increases the nucleation rate by a factor at least about 1.5 compared to a solution that has not been exposed to an applied magnetic field.

In the laboratory scale work described below, crystallization is carried out in Petri dishes. The present process, however, can advantageously be carried out on a commercial scale using any crystallization apparatus, as understood in the sugar industry.

Seed crystals may also be employed in the process of the present invention. The seed crystals employed in the process may be derived from any source, but typically should be of the same general type, character and nature of that of the composition of the sugar in the solution composition, since variations in the nature of the seed crystals from that of the solution composition affect the crystalline properties and crystallization time. If used, it is preferred that the seed crystals represent, at least in part, a crystalline product obtained in the presently recited process and recycled in a subsequent crystallization process.

The magnetic field is generally applied to at least a portion of the solution prior to crystallization or evaporation of a sufficient amount of solvent to induce crystallization. Indeed, the magnetic field may be applied to the solution hours or even days prior to crystallization. Preferably, the magnetic field is applied to at least a portion of the solution within about 1 hour prior to inducing crystallization.

If desired, the magnetic field may be applied to at least a portion of the solution during at least a portion of crystallization and solvent evaporation. The magnetic field may be applied to the solution during substantially all of the crystallization and evaporation. In addition, any combination of magnetic fields applied both prior to and during crystallization and evaporation may be used for certain situations.

The magnetic field is typically applied to the solution in the same location as crystallization or evaporation. Alternatively, the magnetic field may be applied to the solution in a different location from crystallization or evaporation. In a preferred embodiment, flow is used to transport the solution from the magnetic field to a different location for crystallization and evaporation. In addition, at least a portion of the solution may be exposed to the magnetic field more than once, as, for example, by flowing the solution at least twice through a magnetic field.

The fact that the present invention enables sugars to be produced in a desired crystal size and/or shape more conveniently and consistently will be of benefit, for example, in most applications of the sugar in question where the sugar is to be used in solid form rather than being dissolved. Preferably, the hydrates of the invention possess desirable properties relating to, for example, pourability and crystallinity. Thus, another aspect of the invention relates to a confectionary composition comprising a hydrate of a crystalline sugar obtainable by the process according to the invention. In a preferred embodiment, the confectionary composition comprises sucrose hydrate, α-lactose hydrate, erythritol, or a combination thereof. In a more preferred embodiment, the confectionary composition comprises a sucrose hydrate obtainable by the process according to the invention and comprising at least about 1% water by weight, more preferably at least about 10% water by weight.

In particular, any of the above confectionary compositions may be a coating. For example, and not by way of limitation, in the production of confectionary coatings for food products, such as chocolate buttons such as the product sold under the trade mark SMARTIES®, it is often important that the coating should have an attractive bright and shiny appearance. This appearance, which depends at least in part on the particle size of the sugar, can be controlled by use of microcrystalline sugar which can be produced conveniently and consistently by the process according to the invention.

In other confectionery applications, such as, for example, the production of fruit pastilles, large crystals of sucrose (100 μm up to 2 or 3 mm) are required for coating the pastilles because of their particular properties of texture and light reflectance. Such crystals can again be produced conveniently and consistently by the process according to the invention. Sucrose crystals of particular shapes can be produced according to the invention to obtain specific desired effects.

The fact that the sucrose can be produced in the form of a crystalline hydrate may be an advantage in other areas of the confectionery industry such as, for example, the manufacture of milk chocolate, which involves the formation of so-called crumb, which is a mixture of dried milk, sucrose and cocoa butter. Amorphous sucrose is formed during some crumb making processes and traps fat leading to an increase in the amount of fat which is required in the final chocolate recipe. Milk fat is one of the most expensive ingredient in milk chocolate and the use of crystalline sucrose which does not trap fat means that the amount of this expensive ingredient can be reduced. Reducing the amount of fat in the chocolate would also have the effect of reducing the calorific value.

In addition, sucrose represents about half of the total weight of milk chocolate. Thus, use of a crystalline sucrose hydrate having added water will further reduce the caloric value of the chocolate. A preferred embodiment of the invention, comprises a chocolate confection comprising sucrose and further comprising sucrose hydrate wherein the sucrose has a water content sufficient to reduce the caloric value of the chocolate. Preferably, the sucrose comprises at least about 1% water by weight, and more preferably at least about 10% water by weight. Accordingly, use of crystalline sucrose produced according to the present invention allows a significant reduction to be made in the calorific value of the chocolate without any adverse effects on the taste and other properties thereof the chocolate. Another aspect of the present invention relates to a chocolate confectionary composition comprising chocolate and a crystalline sugar obtainable by the process according to the invention.

In a preferred embodiment the chocolate confectionary composition comprises sucrose hydrate, lactose hydrate, erythritol, or any combination thereof. In one embodiment, the chocolate confection comprises a sufficient amount of crystalline erythritol obtainable by the process of the invention to reduce advantageously the caloric content of the chocolate confection. In a more preferred embodiment, the chocolate confectionary composition is prepared with sugar comprising a lactose hydrate obtainable by the process of the invention and is substantially free of added sucrose.

In another embodiment, the chocolate confectionary composition is prepared with crystalline sugar obtainable by the process of the invention and comprises at least about 5% fewer calories than a chocolate confectionary composition prepared with substantially anhydrous sugar and having similar organoleptic qualities. In a most preferred embodiment, the chocolate confectionary composition is prepared with substantially crystalline sucrose which comprises sufficient amount of sucrose hydrate to reduce the amount of calories by at least about 5% as compared to a chocolate confectionary composition prepared with substantially anhydrous sucrose and having similar organoleptic qualities.

Another embodiment of the present invention relates to a food product prepared with a crystalline sugar obtainable by the process of the present invention. Preferably, the food product comprises a crystalline sucrose hydrate comprising at least about 1% water by weight, more preferably at least about 10% water by weight. The crystalline sucrose hydrate may be in combination with anhydrous sucrose. Yet another preferred embodiment relates to a food product prepared with a crystalline lactose obtainable by the process of the present invention, more preferably the food product is substantially free of sucrose in amount sufficient to alter the calorie or organoleptic properties of the food.

The use of techniques such as differential scanning calorimetry (DSC), scanning electron microscopy (SEM), polarizing light microscopy (PLM) and powder X-ray diffraction (XRD) has shown that in the case of sucrose the properties of the crystals formed are consistent with a significant proportion being sucrose hydrates, probably mixtures of the hemi-pentahydrate and the hemi-heptahydrate, in admixture with some anhydrous sucrose. Given that the literature discloses these hydrates as being formed only at low temperatures, it is surprising that they can be formed according to the invention at ordinary or elevated temperatures.

EXAMPLES

The invention is illustrated and supported further by the following experimental work, which is presented by way of example only.

1. Static Crystallization of Sucrose
1.1.0 Experimental
1.1.1 Preliminary Studies Saturated solutions of sucrose were prepared in 5 cm Petri dishes on a hot plate at 50° C. by addition of sucrose to an unspecified amount of de-ionized water until no more sucrose could be dissolved. In the cases of over-addition of sucrose, more water was added to water down the solution. The sucrose solutions in the Petri-dishes, placed in incubators at 50° C., were left to evaporate and crystallize under the different magnetic environments (a)–(f) listed below.

(a) No magnetic field around the crystallizing sucrose solution.
(b) Permanent magnets placed either side of the Petri-dish with field strengths of:
   (i) 300 G at edges, 265 G at center of Petri-dish
   (ii) 400 G at edges, 350 G at center of Petri-dish
   (iii) 640 G at edges, 540 G at center of Petri-dish
   (iv) 760 G at edges, 630 G at center of Petri-dish.
(c) Permanent magnets 1 placed in a square around a Petri dish 2, as shown in FIG. 1. The field strength at a point 3 was 260 G, at a point 4 was 200 G, at a point 5 was 60 G, and at a point 6 was 50 G.
(d) Permanent magnets placed above and below Petri-dish with a field strength of 60 G.
(e) A pulsed magnetic field that passes in two directions alternately with the Petri-dish placed above the center.
(f) DC electromagnets with poles placed at either side of the Petri-dish with field strengths of:
   (i) 100 G at edges, 50 G at center of Petri-dish
   (ii) 320 G at edges, 140 G at center of Petri-dish
   (iii) 500 G at edges, 195 G at center of Petri-dish
   (iv) 600 G at edges, 220 G at center of Petri-dish.

Visual observations were recorded following crystallization of the sucrose solutions and the crystals collected and dried.

1.1.2 Controlled Conditions Investigation

Experiments were performed under the same format as before but with alterations listed below included in the preparation of samples before placement in incubators:
(a) 10 ml de-ionized water was placed in the Petri-dishes,
(b) 4.66 g sucrose was added to the water (around 80% saturated) and heated on a hot-plate at 50° C. for two hours until fully dissolved,
(c) Samples were prepared free of dust or foreign material by covering the Petri-dishes during the sucrose dissolving stage.

Each experiment was repeated 3 times and visual observations were noted.

1.2.0 Results and Discussion
1.2.1 Results from preliminary studies on static sucrose crystal growth The main aim of the experiment was to create a controlled environment which would allow evaporation of water from aqueous sucrose solutions, i.e. slow crystallization of sucrose, and to investigate the effect on the crystal growth process of various magnetic fields.

Five centimeter diameter Petri-dishes were utilized as a crystal growth container as its size allowed evaporation and crystal growth over the course of 2 days. The solutions for the preliminary trials were prepared in the Petri-dishes in an unmeasured amount of de-ionized water. Incubators were used as a means of controlling the temperature and included a fan that circulated the air inside to aid evaporation.

Figure 2A:
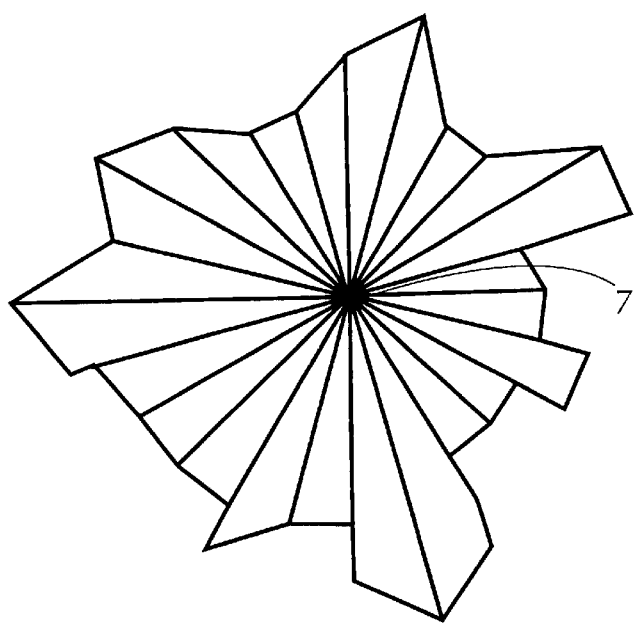
FIG. 2 shows (a) wedge growth and (b) dendritic growth of sucrose crystals.
Figure 2B:
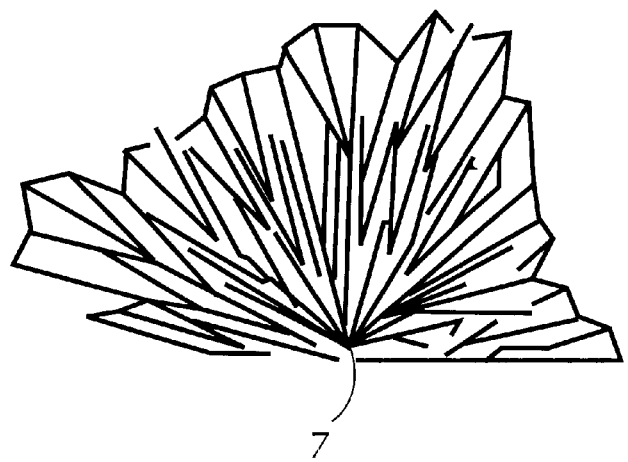

Evaporation studies showed that over-saturation resulted in catastrophic solidification in the form of small rectangular crystals that formed a film across the solution/air interface within 2 hours. In general, lower levels of saturation resulted in crystal growth in a characteristic circular fan pattern. Growth begins from a point of nucleation 7 and continues circularly outwards forming single crystal wedges with larger crystal growth faces (see FIG. 2(a)). In some cases finer, needle-like crystals can be formed which will be referred to as dendritic and where the needles do not originate from the point of nucleation 7 but from a point of growth at some distance from the center (see FIG. 2(b)). Since different forms were obtained from different levels of saturation the investigation was continued under controlled conditions.

1.2.2 Visual Observations From Controlled Studies 1.2.2(a) Control or "No Field" Sucrose Crystals Sucrose crystals grown without a magnetic field in general formed over 24 hours. The earliest centers of nucleation resulted in the largest circular diameters of growth that predominated most of the surface of the sucrose solution. On average there were five centers of nucleation with 3 larger that predominated the sucrose solution surface. The smaller crystal growths which will be referred to as secondary nucleations, formed in the remaining solution around the larger areas of crystal growth until there was no sucrose solution/air interface left. The crystal surfaces were in general, uneven, disordered and chunky, especially where the crystallization from different centers of nucleation met, and were in the form of wedge growth.

30 1.2.2(b) Permanent Magnetic Fields

The general forms of the sucrose crystals obtained from the permanent magnetic field studies were similar to the "no-field" situation i.e. circular growth patterns, but there were subtle differences worth noting.

1.2.2(b) (i) 300 G at Edges, 265 G at Center of Petri-dish

Here, the weakest permanent field had a similar number of centers of nucleation i.e. on average around 6 or 7. The largest circular growth patterns came from three nucleation centers and there were on average 3 to 4 smaller growth patterns from secondary nucleations. The most obvious visual difference was the fine structure that made up the circular growth patterns. The crystals were very clear in appearance made up of many fine wedges that have grown in very straight lines outwards from the point of nucleation. Boundaries of the circular growth patterns formed almost straight lines and there were no chunky or disorganized regions. In general, the crystal growths were more ordered and had a finer structure.

1.2.2(b)(ii) 400 G at Edges, 350 G at Center of Petri-dish

On average, use of a slightly stronger permanent field resulted in fewer centers of nucleation i.e. on average 5. In most cases, the majority of sucrose crystal growth came from 4 centers of nucleation that dominated the surface of the sucrose solution. In addition to the finer structure of the sucrose crystal growth observed in the weaker permanent field case, some flat clear wedges were observed.

Boundaries between circular growth patterns were again almost straight lines and in general the sucrose crystals grown under these magnetic conditions were more ordered than the "no-field" situation.

1.2.2(b)(iii) 640 G at Edges, 540 G at Center of Petri-dish

Fewer centers of nucleation (on average 4) were observed from the sucrose crystal growth under stronger permanent magnetic field conditions. However, since there were no secondary nucleation centers, crystal growth came from around four centers of nucleation resulting in larger diameters of growth. The sucrose crystal growth was fine at the centers of nucleation, but became wider, flat, clear wedges as growth continued away from the center. Incomplete layered crystal growth could be seen on the flat, wedge surfaces and caused them to look opaque. Boundaries were again very even and the growth patterns more ordered than the "no-field" conditions.

1.2.2(b) (iv) 760 G at Edges, 630 G at Center of Petri-dish

Again fewer centers of nucleation (on average 2) were observed from the stronger permanent field sucrose crystal growth conditions. Where crystal growth was close to the center of nucleation, the sucrose crystals were fine but dendritic. Some had the appearance of overlapping wedges. Growth away from the center of nucleation resulted in large well formed wedges with layered growth visible. Boundaries of circular growths were in the form of interlocking zigzags indicating crystal twinning and were even and flat. Secondary nucleation was limited to a very small area and on average consisted of growth from only 1 or 2 centers. The resulting secondary nucleation sucrose crystals were ordered and fine. In summary, the growth patterns resulted in very ordered, and excessively large wedges in most cases with some evidence of dendritic growth.

1.2.2(c) Permanent Magnetic Fields in a Square Around Sample

The square orientation of the permanent magnets resulted in crystals with more needle shape. Growth was dendritic therefore wedge shapes were not observed. On average there were two larger spherulitic growths and 3 or 4 smaller ones. As the diameter of the spherulitic growth became larger more needles began to grow, and most had the dimensions of 2–3 mm width with variable length. Boundaries between spherulitic growths are like interlinking zigzags (twinning) and are well ordered and flat. The overall impression is that it is more ordered crystal growth than the "no-field" situation as crystals are clear and well formed.

1.2.2(d) Permanent Magnetic Field Above and Below Sample

Figure 3:
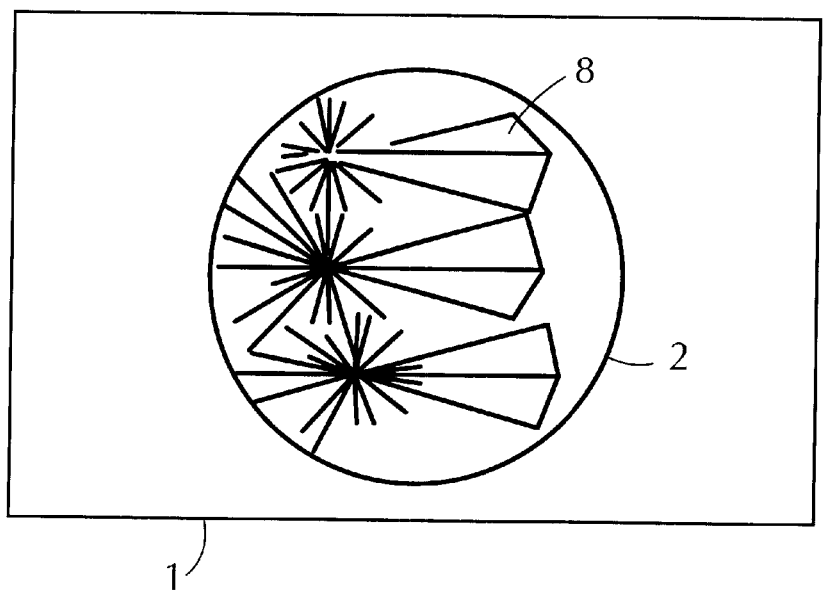
FIG. 3 is a diagram from above representing sucrose crystal growth under the conditions of a permanent magnetic field placed above and below the sample.

Crystal growth was again fine and ordered in appearance consisting mainly of fine wedges or needles. In addition, there appeared to be a favored direction of growth for larger wedges 8 as shown in FIG. 3, which is a diagram from above representing sucrose crystal growth under the conditions of a permanent magnetic field placed above and below the sample.

In addition, the numbers of centers of nucleation was on average 3, a reduction from the "no-field" case. In some cases, secondary nucleation was observed but was limited to very small growth areas. The boundaries of the circular growths had the appearance of interconnecting zigzags (twinning) and was ordered in appearance. The fine, almost needle-like wedges were very clear, however the larger wedges were opaque from the incomplete layers of crystal growth. In summary, the sucrose crystals grown under these conditions appeared to result in a more ordered crystal but demonstrated a favored direction of growth.

1.2.2(e) Pulsed Magnetic Field

Figure 4:
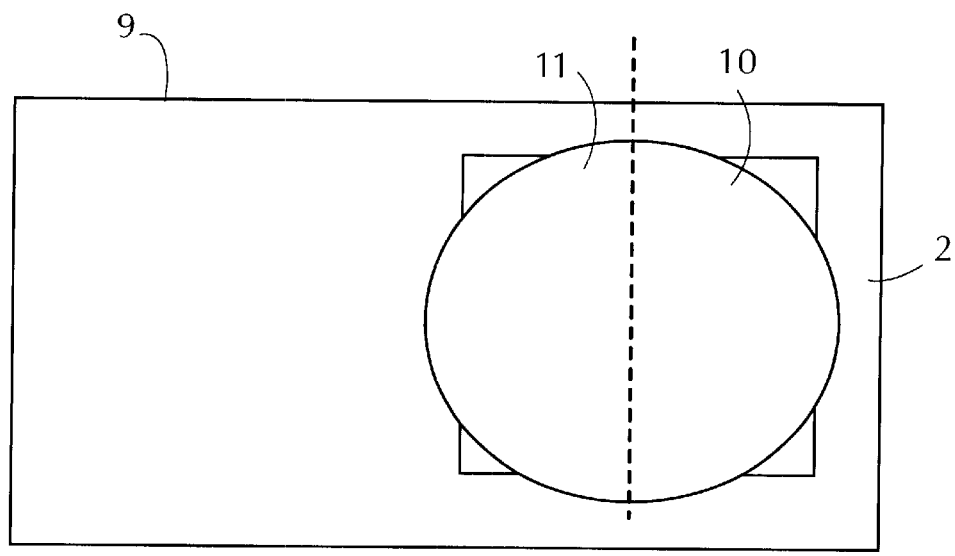
FIG. 4 is a diagram of pulsed magnet and sucrose solution apparatus.

The pulsed magnet 9 is incorporated into a rectangular plastic device shown in FIG. 4. The 5 cm Petri-dish 2 was placed on top of the magnetic unit as it was too large to fit in the square hole as normally used. Primary nucleation on several occasions occurred predominantly on a right hand side 10 of the Petri-dish but growth on this side was slow. Secondary nucleation on a left hand side 11 and was followed with increased growth rate. Most of the resulting sucrose crystallization came from the left hand side from on average 3 or 4 centers of nucleation in large circular wedge fans. These were more ordered in appearance than the "no-field" situation and showed sharper edges. The right hand side had on average 4 or 5 very small, fine circular wedge growths.

This result was not always reproducible and so the experiment was repeated several times more. On one occasion there was no nucleation on the right hand side, only large wedged growth from centers of nucleation on the left hand side. Two other experiments showed a selection of smaller circular growth patterns, on average 10, occurring with fine dendritic growth.

1.2.2(f) DC Electromagnetic Fields

The general forms of the sucrose crystals obtained from the DC electromagnetic field studies were altered in the stronger field cases from the "no-field" situation with in general euhydral growth predominating.

1.2.2(f) (i) 100 G at Edges, 50 G at Center of Petri-dish

The sucrose crystals under DC electromagnetic field conditions had on average 3 large circular growths that predominated most of the surface of the sucrose solution. These fine wedge growths showed a small amount of dendricity and were very ordered in appearance. There were in addition around 3 or 4 smaller circular growths that were finer but less well ordered with some disorganized areas. Boundaries of the circular growths were interlocking zigzags and were ordered. In summary, the sucrose crystals were fine and more ordered than the "no-field" situation.

1.2.2(f) (ii) 320 G at Edges, 140 G at Center of Petri-dish

More large centers of nucleation (on average 5) were observed under these conditions of sucrose crystal growth, with around 3 or 4 smaller circular growths. In general, there is more dendricity, and more irregular patterns within the expected circular growth patterns. Layered growth can be seen very clearly from most of the wedges and crystals are predominantly more needle shaped from the increased dendricity. In summary, nucleation has increased but growth is more irregular than in the weaker field case, although crystals are more ordered than the "no-field" case.

1.2.2(f) (iii) 500 G at Edges, 195 G at Center of Petri-dish

Figure 5:
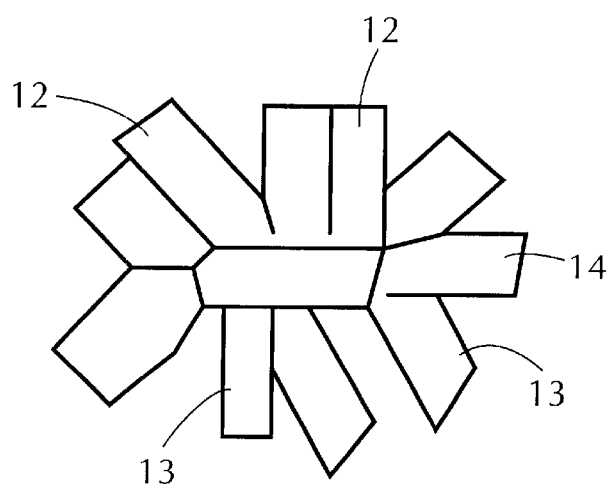
FIG. 5 shows general euhedral sucrose crystal shapes obtained from DC field case (iii) below.

The stronger DC electromagnetic field resulted in more centers of nucleation (on average 6) with 3 or 4 smaller growths, but the main point of note was the shape of the crystals that were obtained. The centers of nucleation were not points as in all previous cases but were rectangular crystals. Growth from these rectangular nucleation points was rectangular 12 with definite flat edges 13 as shown in FIG. 5 and is normally termed euhydral. Crystals were more chunky in appearance and crystallinity appeared improved. Ends 14 of the growth rectangles were square in shape and borders between circular growths were straight indicating no crystal twinning has occurred. In addition, the crystal growth time was slower taking around twice as long to crystallize over the sucrose solution surface/air interface. In summary, the DC magnetic field appears to have altered the sucrose morphology, growth rate and crystallinity.

1.2.2(f)(iv) 600 G at Edges, 220 G at Center of Petri-dish

The effects from the last DC electromagnetic field were emphasized under these stronger conditions. Around 10 or 11 centers of nucleation were observed in most cases, with euhydral growth predominant. In addition, the growth rate appeared to be even slower than case (f) (iii), taking around 3 days to crystallize over the sucrose solution surface. In summary, an increased DC electromagnetic field has reduced, the growth rate, increased the nucleation rate, changed the morphology and increased the crystallinity.

Results are summarized in the following Table:

TABLE 1.2

| GEOMETRY | TYPE OF FIELD AND STRENGTH | NO. OF NUCLEATION CENTERS | NO. OF NUCLEATION CENTERS | TOTAL NUCLEATION CENTERS |
| --- | --- | --- | --- | --- |
| N/A | Control | 3 | 2 | 5 |
| Parallel N-S | Permanent (265–300G) | 3 | 3 to 4 | 6 or 7 |
| Parallel N-S | Permanent (350–400G) | 4 | 1 | 5 |
| Parallel N-S | Permanent (540–640G) | 4 | 0 | 4 |
| Parallel N-S | Permanent (630–760G) | 1 | 1 | 2 |
| Square (FIG. 1) | Permanent (60–260G) | 2 | 3 or 4 | 5 or 6 |
| Above and below N-S | Permanent (60G) | 3 | 0 | 3 |
| N/A | Pulsed | 3 or 4 | 4 or 5 | 7 to 9 |
| N-S | DC electro magnetic (50–100 G) | 3 | 3 or 4 | 6 or 7 |
| N-S | DC electro magnetic (140–320G) | 5 | 3 or 4 | 8 or 9 |
| N-S | DC electro magnetic (195–500 G) | 6 | 3 or 4 | 9 OR 10 |
| N-S | DC electro magnetic (220–600 G) | 10 OR 11 | 0 | 10 OR 11 |

1.3.0 Conclusion

These preliminary results suggest that static sucrose crystal growth can be affected by external magnetic fields. Magnetic fields appear to have altered crystal characteristics such as growth rate, nucleation rate, morphology and crystallinity.

1.4.0 Further Investigations of Static Crystallization of Sucrose in Magnetic Fields Differential Scanning Calorimetry (DSC) was carried out using a Perkin Elmer DCS7. Powder X-Ray Diffraction (XRD) was carried out using a Philips PW 1710 diffractometer with Cu $K_\alpha$ radiation. Scanning Electron Microscopy (SEM) was carried out using a Cambridge 5250 stereoscan. Karl Fischer titrations (KF) were carried out using an Orion Research Inc. Turbo 2 Titrator.

Scanning Electron Microscopy (SEM) was used to look at the smaller =structure of sucrose crystals produced as described above at around ×50 to ×500 magnification. Here also, some very large differences in surface texture could be seen.

Figure 6:
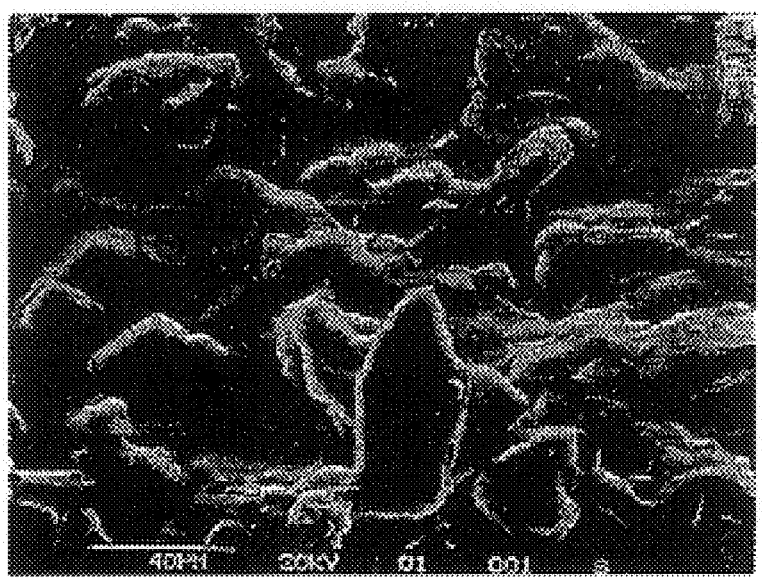
FIG. 6 shows surface texture of crystallized sucrose with no magnetic field viewed using SEM at ×540 magnification.

The control samples ("no-field") showed a very irregular surface texture made up of blobs of sucrose on the surface. These were poorly crystallized lumps and the surface was almost amorphous in texture (see FIG. 6).

Figure 7:
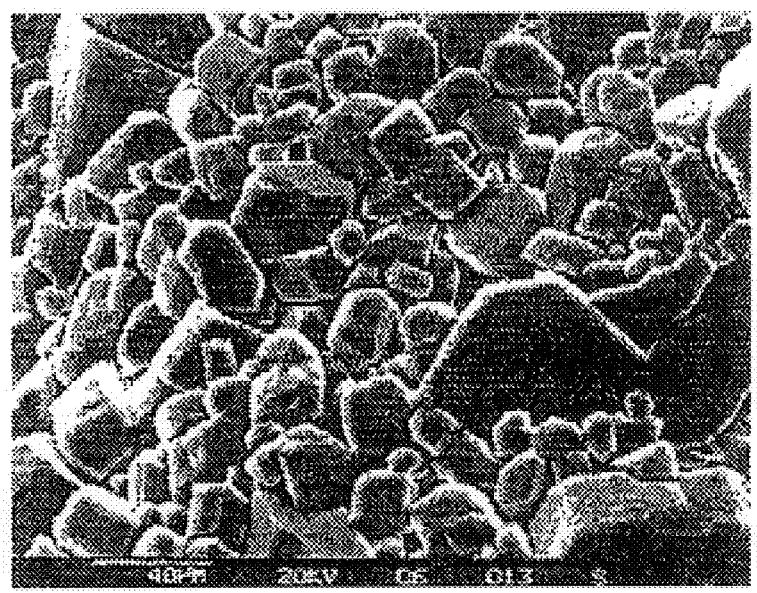
FIG. 7 shows microcrystalline material on the surface of a sucrose crystal, crystallized in a 700 G permanent magnetic field viewed using SEM at ×470 magnification.
Figure 8:
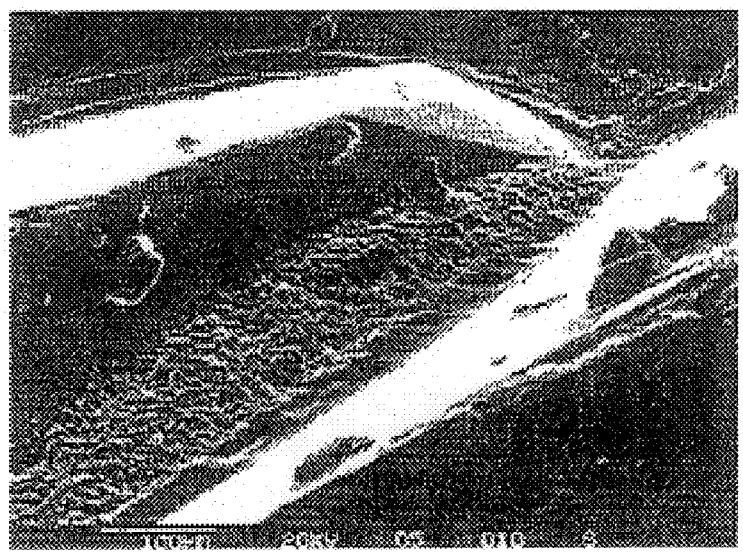
FIG. 8 shows flat surfaces of a sucrose crystal grown in an 80 G permanent magnetic field and viewed using SEM at ×65 magnification.
Figure 9:
FIG. 9 shows layered crystal growth viewed on a sucrose crystal surface grown in a 700 G permanent magnetic field viewed using SEM at ×170 magnification.

By comparison, all samples of sucrose that were crystallized in a magnetic field showed a large amount of micro crystalline material (see FIG. 7). As seen in FIG. 7, many of the crystals were smaller than about 25 $\mu$m on edge. These crystals are well formed and angular with very flat surfaces. In addition, the larger crystals had very flat, smooth surfaces with definite angled faces of growth as demonstrated in FIG. 8. These surfaces also showed very definite layered crystal growth which appear to the naked eye as opaque (or cloudy) surfaces (see FIG. 9).

Figure 10:
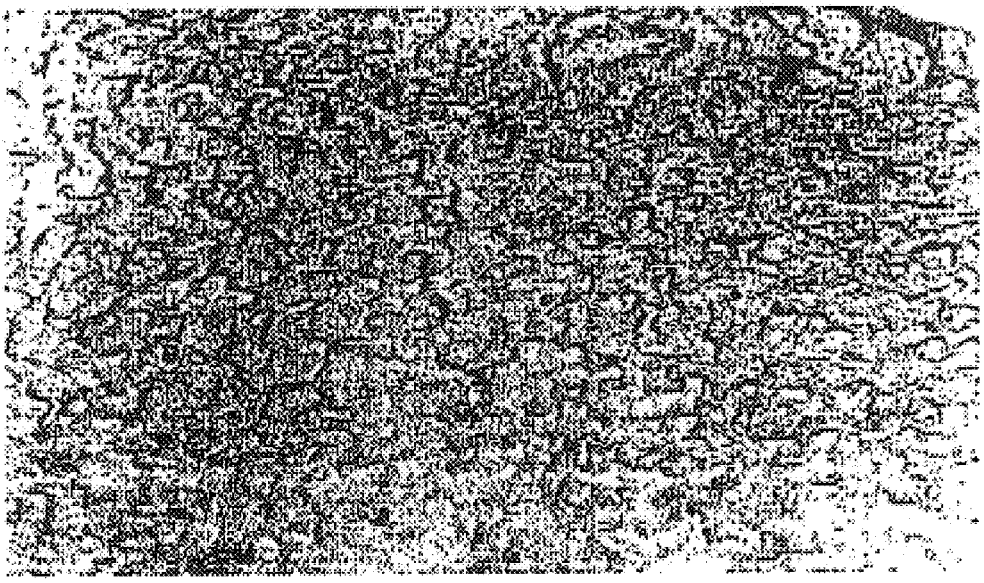
FIG. 10 shows the surface of a sucrose crystal grown with no magnetic field viewed using PLM at 10× magnification.
Figure 11:
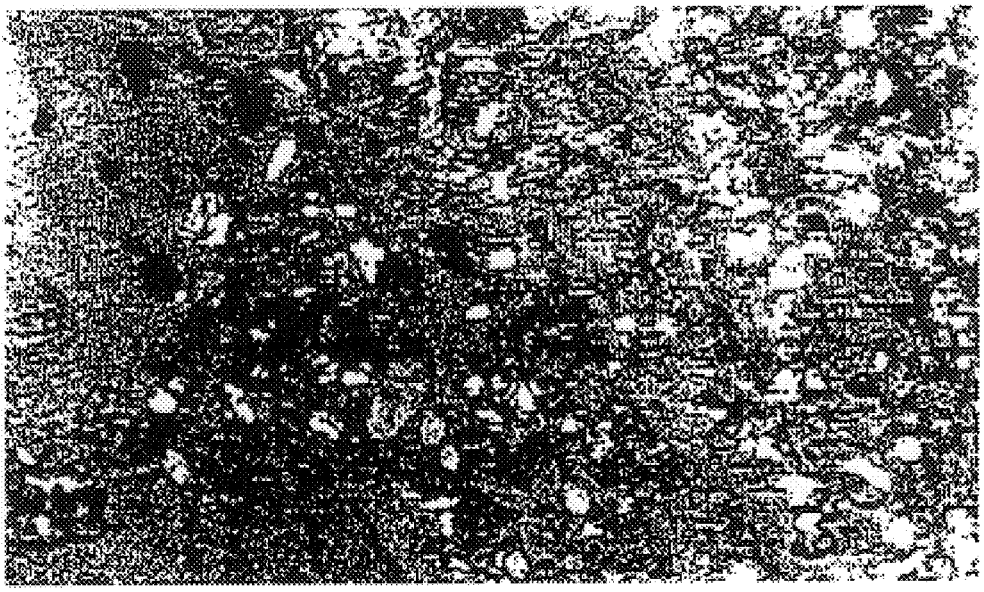
FIG. 11 shows microcrystalline material present on the surface of sucrose crystals formed in a 300 G DC electromagnetic field.
Figure 12:
FIG. 12 shows microcrystalline material present on the surface of sucrose crystals formed in a 150 G permanent magnetic field.
Figure 13:
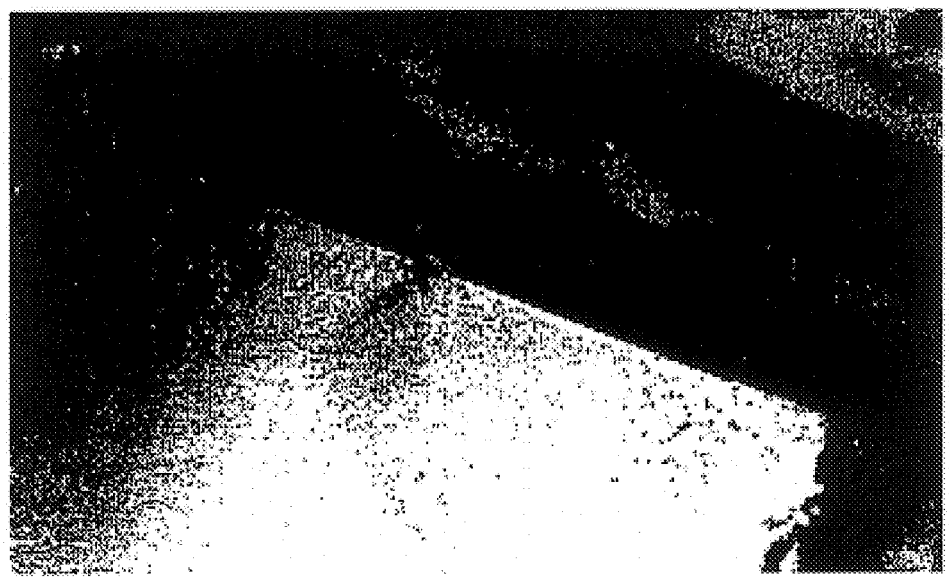
FIG. 13 shows flat surfaces and angled corners shown on sucrose crystals grown in a 400 G DC electromagnetic field.
Figure 14:
FIG. 14 shows flat surfaces and angled corners shown on sucrose crystals grown in a 400 G DC electromagnetic field.
Figure 15:
FIG. 15 shows layered growth of sucrose crystal surfaces grown in a 150 G permanent magnetic field.
Figure 16:
FIG. 16 shows layered growth of sucrose crystal surfaces grown in a 350 G DC electromagnetic field.

Polarizing Light Microscopy (PLN) at ×10 magnification showed similar features on the sucrose crystals. The control ("no-field") samples had lumpy, irregular surfaces shown in FIG. 10, while the samples crystallized in magnetic fields showed a large amount of micro-crystalline material present shown in FIGS. 11 and 12. Flat regular surfaces are shown in FIGS. 13 and 14 and again layered growth in FIGS. 15 and 16.

Figure 17:
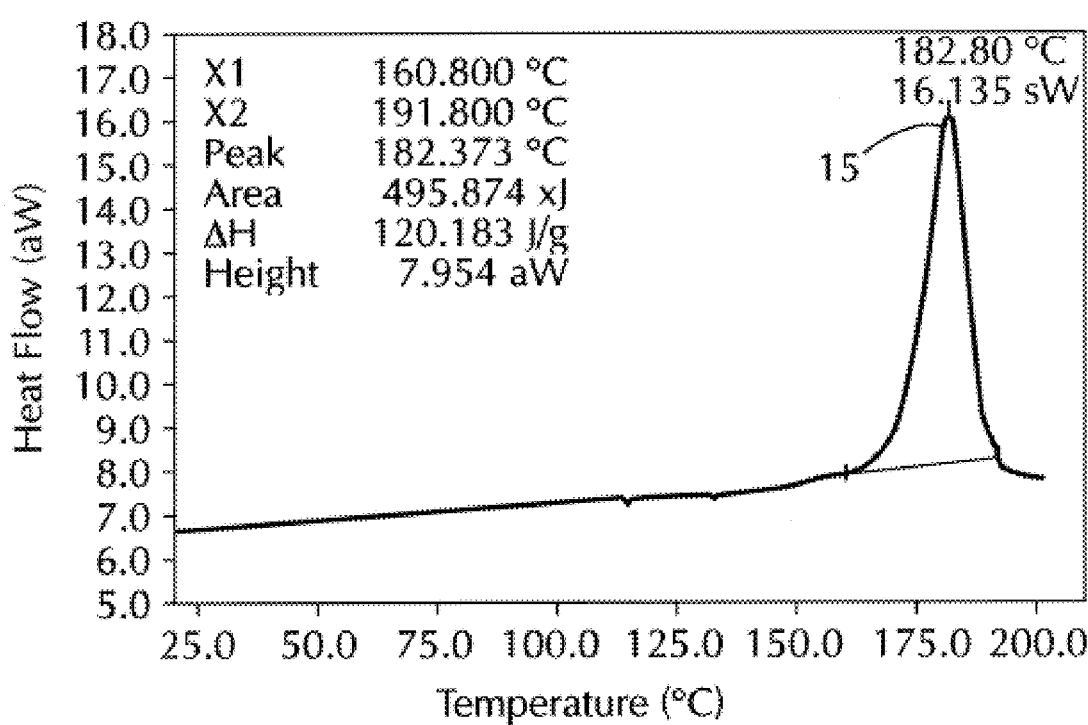
FIG. 17 shows the DSC melting profile for sucrose control ("no-field") crystals.

Differential Scanning Calorimetry (DSC) gives the melting profile of the sucrose crystals. Normally sucrose crystals are anhydrous (i.e. devoid of water) and melt around as indicated by a peak 15 at 180–192° C. in a DSC trace for anhydrous sucrose, which is shown in FIG. 17. There are literature reports (referred to above) of the formation of hydrated sucrose but the product has been formed exclusively at −30 to 0° C.

Figure 18:
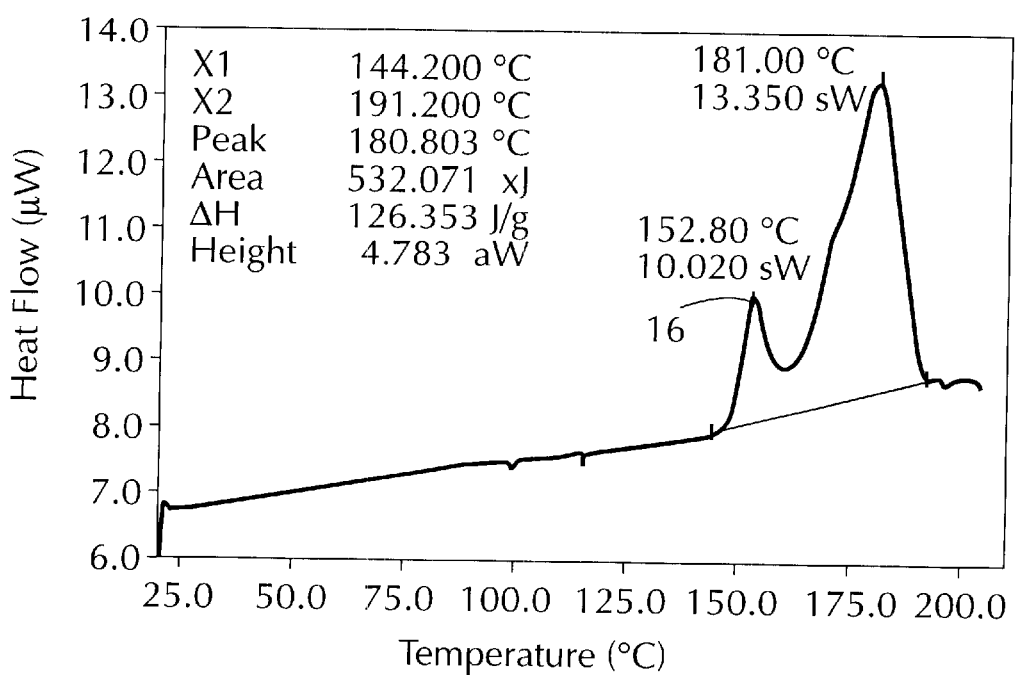
FIG. 18 shows DSC melting profile for sucrose crystals grown in a 300 G permanent magnetic field.
Figure 19:
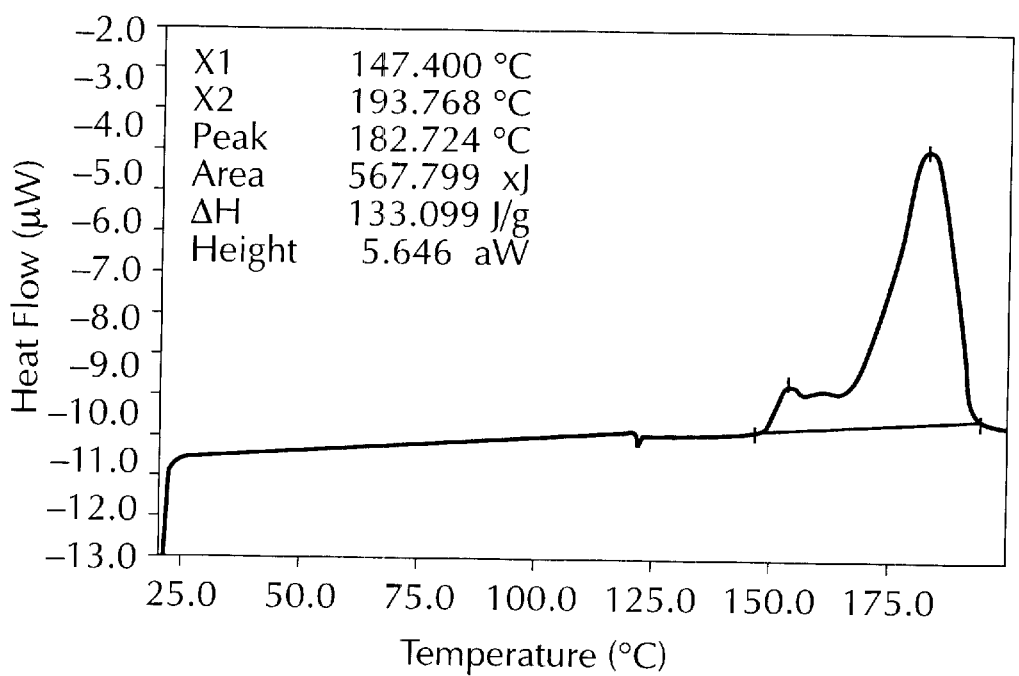
FIG. 19 shows DSC melting profile for sucrose crystals grown in a 600 G permanent magnetic field.

In every case of sucrose crystallization within a magnetic field reported herein, two or three other features appear on DSC with a peak 16 related to a second melting point around 150° C. and in some cases a third melting phase around 170° C. in addition to the normal sucrose melting peak at 180–192° C. These are shown in FIGS. 18 and 19. Two possible explanations for the presence of additional peaks on DSC could be (1) formation of sucrose hydrates, or (2) a new crystalline sucrose phase.

The % moisture content (by weight ratio) of the sucrose crystals was measured using Carl Fischer titrations. Bottled crystalline sucrose had a moisture content of around 0.02%, while the control (i.e. no magnetic field) samples had a moisture content of around 0.06%. The most significant change in moisture content was for a sucrose crystal grown in a permanent magnetic field (field strength of around 380 Gauss) that was a 15 fold increase in water inclusion within the sucrose crystal to give a moisture content of around 1%.

There are three possible explanations for the additional water inclusion (1) surface water that is weakly bound to the sucrose crystal surface, (2) "packets" of trapped water (water inclusions) within the uneven packing of the crystal that would again be weakly bound to the sucrose crystal, or (3) water molecules have been incorporated into the sucrose crystal lattice and are very tightly held within the sucrose molecular structure.

To eliminate the possibilities of both (1) and (2), ground sucrose crystals produced according to the invention were dried over phosphorus pentoxide for 40 hours to allow for removal of any weakly bound water. The resulting DSC trace of the dried sucrose crystal showed melting peaks at 150° C. and 180° C. suggesting that removal of the weakly bound water did not alter the melting profile of the sucrose crystal.

In order to identify the nature of this water, solid state proton NMR was carried out on the sample. Immediate data collection following crushing of the sample revealed a broad peak indicative of weakly bound water from inclusion water, i.e. sucrose syrup at around 5.5 ppm. A sample ground several days before would be expected to be devoid of water inclusions but showed a sharper peak at around 5.5 ppm. This is indicative of bound water within the sucrose crystal.

Therefore, the results of the moisture content investigations provide support for a novel sucrose hydrate production at 50° C.

Powder X-ray diffraction (XRD) of sucrose crystals produced according to the invention, revealed a complex diffraction pattern when compared to literature powder XRD data recorded for sucrose hemi-pentahydrate and sucrose hemi-heptahydrate. The diffraction patterns when compared to that of standard sucrose showed many broader peaks that were off-center, with d-spacings both greater and smaller than the standard sucrose values, and were of greater intensity. The diffraction patterns of the samples were consistent with the presence of a mixture of the two hydrates and anhydrous sucrose. In conclusion therefore, it is most likely that sucrose hydrates have been prepared by the application of magnetic fields around the crystallizing samples.

2. Dynamic Investigations into Sucrose crystallizations using Magnetic Fields

The investigation was set-up to allow the flow of a sucrose solution to pass through a magnetic field up to 8 times. An aliquot of solution was removed after each pass and allowed to crystallize normally under controlled temperature conditions at 50° C. The general visual differences in the sucrose crystals formed were similar to those observed under static conditions.

In summary, DC electromagnetic fields promote euhydral growth (i.e. more rectangular form) and appear to slow crystal growth while increasing the number of centers of growth (i.e. nucleation) with increasing field strength. Permanent magnetic fields appear to reduce the number of centers of growth with increasing field strength and the resulting crystals are more crystalline compared to the control "no-field" situation.

Differential Scanning Calorimetry (DSC) measurements show the same melting profile as the static sucrose samples confirming the formation of sucrose hydrates.

3. Preliminary Studies on the Static crystallization of Lactose

Crystallization of lactose was investigated under static conditions in the presence and absence of magnetic fields. Early observations suggest that the crystal forms are altered by the magnetic fields. The crystals formed under the influence of a magnetic field are white in appearance and have surface texture as compared to the clear, glassy white surface observed in the control ("no-field") crystals.

4. Further Studies on the Crystallization of Lactose
4.0 Experimental
A 20% undersaturated solution of α-lactose monohydrate (340.00 g, 0.944 moles) was prepared and stored in an incubator at 50° C. deionized water was used for preparation of the solution and the solvent bottle was covered to prevent contamination from foreign materials. Care was taken to keep this stock solution away from any magnetic fields.

In general, 10 ml of the undersaturated lactose solution was evaporated in Petri dishes without lids at 50° C. in an incubator. At the bottom of the incubator, a tray of silica gel was used to absorb any excess moisture ensuring that crystallization was not affected by the humidity of the atmosphere in the incubator.

The Petri dishes containing lactose solution were subjected to various magnetic fields with differing strengths are described in more detail hereinafter.

4.1 Controlled Environment Studies

A stock solution of α-lactose monohydrate was accurately prepared and stored in an incubator at 50° C. A series of nine experiments were carried out on the solution, each repeated three times.

4.1.1 Control

A pipette was used to place lactose solution (10 ml) into a Petri dish (5 cm diameter) with the lid in place until placed in the incubator. The solution was kept at 50° C. in the incubator until the following day when crystallization was complete.

4.1.2 Weakest Permanent Field at Sides in Parallel

Permanent magnetic fields were placed in a wooden base in parallel. The 5 cm diameter Petri dish containing the lactose solution (10 ml) was placed in the center between the magnets on another empty Petri dish (as a raised platform). The field strengths were measured being about 300 G at the edges and about 265 G at the center. The solution was kept overnight to crystallize.

4.1.3 Medium Permanent Field at Sides in Parallel

Permanent magnetic fields were placed in a wooden base in parallel with two more placed on either side on the outside. The 5 cm diameter Petri dish containing the lactose solution (10 ml) was placed in the center between the magnets on another empty Petri dish (as a raised platform). The field strengths were measured being about 640 G at the edges and about 540 G at the center. The solution was kept overnight to crystallize.

4.1.4 Strongest Permanent Field at Sides in Parallel

Figure 20A:
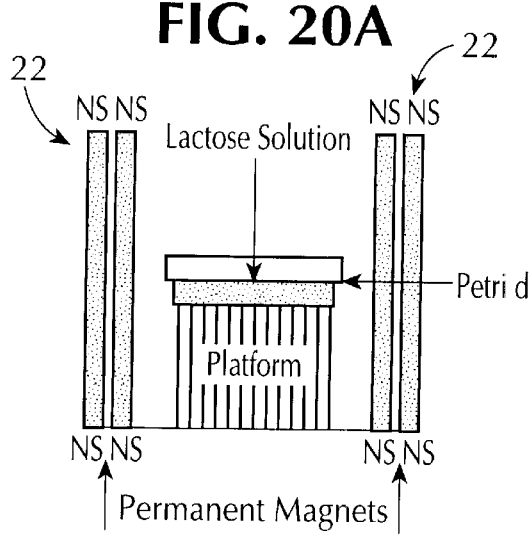
FIG. 20 shows a diagrammatic illustration of an apparatus for crystallization of lactose under a permanent magnetic field at sides in parallel.
Figure 20B:
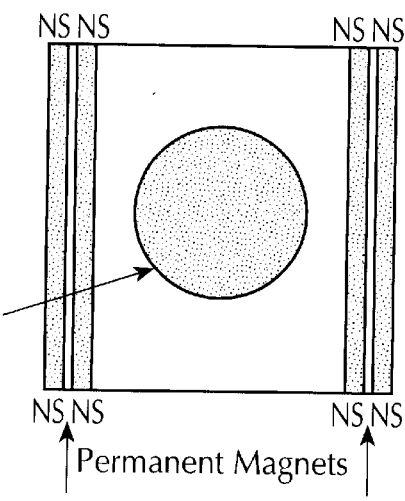

An additional two magnets were placed around those in Experiment 3, making the field strengths about 760 G at the edge and about 630 G at the center. The 5 cm diameter Petri dish containing 10 ml of a lactose solution 18 was placed in the center between the magnets on another empty Petri dish (as a raised platform). The solution was kept overnight to crystallize. The arrangement used in Experiments 2 to 4 is shown diagrammatically in FIG. 20, numeral 22 shows the general placement of the magnet or groups of magnets.

4.1.5 Permanent Field in Parallel Above and Below

Figure 21A:
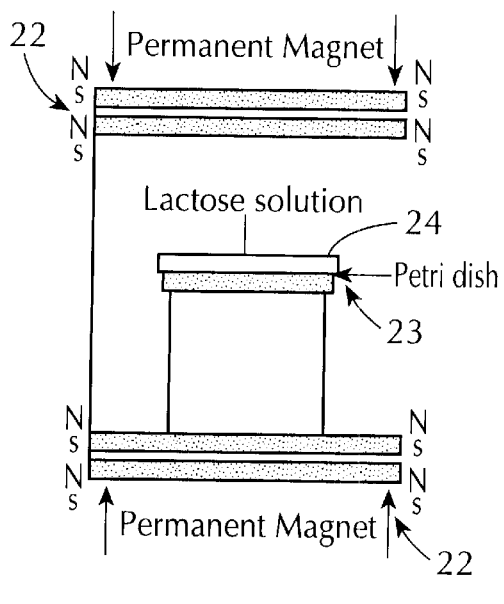
FIG. 21 shows a diagrammatic illustration of an apparatus for crystallization of lactose under a permanent magnetic field above and below.
Figure 21B:
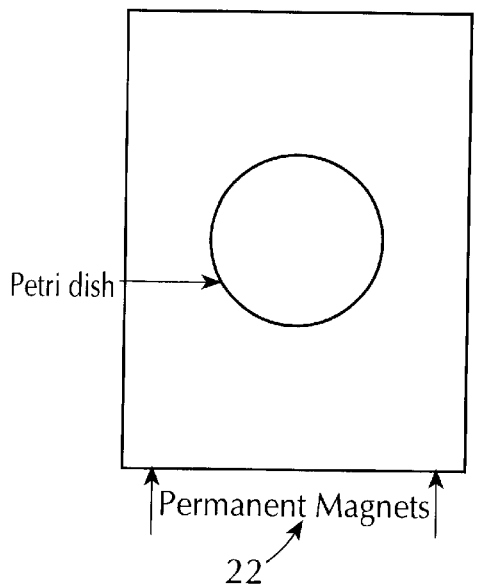

The wooden block containing the strongest permanent field set-up was turned on its side and Petri dish 23 with the lactose solution (10 ml) 24 was placed centrally between the parallel magnets on a raised platform. The field strengths were measured at about 630 G throughout the sample. The solution was then left overnight to crystallize. The arrangement used is shown diagrammatically in FIG. 21.

4.1.6 Pulsed Field

Figure 22:
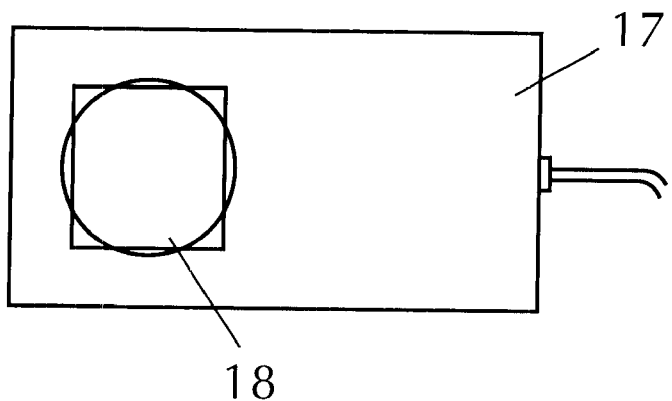
FIG. 22 shows a diagrammatic illustration of an apparatus for crystallization of lactose under a pulsed magnetic field.

A hydroflow pulsed magnet 17 was placed on its side with a Petri dish containing lactose solution (10 ml) 18 balanced on top. The solution was then left overnight to crystallize. The arrangement used is shown diagrammatically in FIG. 22.

4.1.7 Strongest DC Electromagnetic Field

Figure 23:
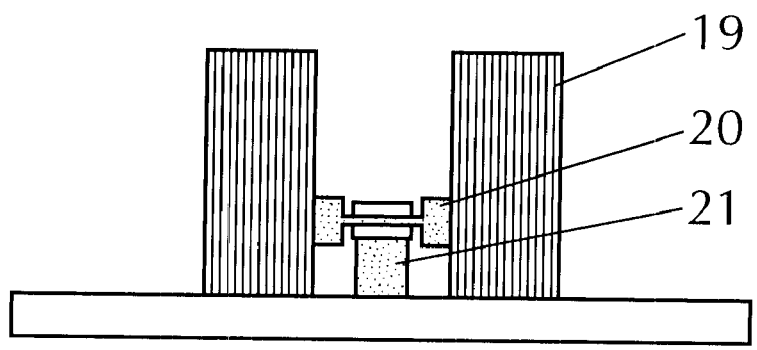
FIG. 23 shows a diagrammatic illustration of an apparatus for crystallization of lactose under a DC electromagnetic field.

As shown in FIG. 23, a DC electromagnet 19 was placed inside the incubator with the connectors and tubing pulled out through the side hole of the incubator. A water flow system was set up to ensure that the DC magnet did not overheat. The field strength of the electromagnet was measured to be 600 to 220 Gauss and the Petri dish containing the lactose solution (10 ml) 20 was placed on a raised platform 21 between the two poles of the magnet. The solution was left overnight to crystallize.

4.1.8 Weakest DC Electromagnetic Field

The field strength of the electromagnet was measured to be 50 to 100 Gauss and the Petri dish containing the lactose solution (10 ml) was placed on a raised platform between the two poles of the magnet. The solution was left overnight to crystallize.

4.1.9 Medium DC Electromagnetic Field

The field strength of the electromagnet was measured to be 160 to 420 Gauss and the Petri dish containing the lactose solution (10 ml) was placed on a raised platform between the two poles of the magnet. The solution was left overnight to crystallize. The arrangement used in Experiments 7 to 9 is shown diagrammatically in FIG. 23.

4.2 Results and Discussion 4.2.0 Introduction

The purpose of the studies was to investigate the effects of applied fields on the crystallization of lactose under static conditions with a regulated temperature and humidity environment. A 20% undersaturated solution was used to ensure that crystallization did not occur too quickly allowing the effect of the applied fields on the lactose solution to be at an optimum level.

Five methods were used to investigate the morphology, size and properties of the lactose solutions crystallized under the influence of the applied field these being as follows:

1. Visual observation
2. Differential scanning calorimetry
3. Powder X-ray diffraction
4. Scanning electron microscopy
5. Karl Fischer titrations.

The lactose crystals were removed from the Petri dishes and visual observations were made noting any changes in brittleness or firmness and placed in a sintered glass Buchner funnel to dry. The crystals were then stored in sample tubes at room temperature before being subjected to the other four investigations.

4.2.1 Visual Observations

Visual observations made with the naked eye are summarized in Table 4.2.1.

| Sample | Observations of Crystal Morphology |
| --- | --- |
| 1(1) 1(2) 1(3) | Brittle, white-grey in color, indicative of cL-lactose monohydrate. |
| 2(1)2(2)2(3) | Quite similar results to those seen in experiment 1, but crystals were slightly more brittle, again white-grey colored. |
| 3(1)3(2)3(3) | White-yellow colored, two different layers seen. The bottom layer was crystalline and glassy with tiny "gaps" in the macroscopic structure. The top layer had a rough texture. The phase in between the layers was very crystalline. |
| 4(1) 4(2) 4(3) | Observations similar to those seen in experiment 3. |
| 5(1) 5(2) 5(3) | Similar to experiments 3 and 4,' the crystals were thin and crusty at the edges with an uneven upper surface. Again tiny spaces/gaps were observed, especially on the bottom layer. Crystals were more brittle than those seen in experiment 4. |

-continued

| Sample | Observations of Crystal Morphology |
|---|---|
| 6(1) 6(2) 6(3) | Observations were similar to those seen in experiment 5. |
| 7(1) 7(2) 7(3) | Similar observations to those seen in experiment 5, however the crystals were more brittle, fine and powdery and very difficult to remove from the Petri dish. |
| 8(1) 8(2) 8(3) | Observations were similar to those seen in experiment 7. |
| 9(1) 9(2) 9(3) | Observations were similar to those seen in experiment 8. |

The first notable observation was the color change. The controls appeared to be glassy-grey whilst the samples crystallized under the influence of an applied field had a more "whiter" appearance. The samples subject to a permanent field, parallel at sides (experiments 2(1) to 4(3)) were visually quite similar to the controls except for the slight color change and the increase in brittleness. Experiments conducted using a permanent magnet above and below (experiments 5(1) to 5(3)) and a hydroflow pulsed magnet (experiments 6(1) to 6(3)) produced yet more brittle crystals with a rougher texture. The DC electromagnetic field (experiments 7(1) to 9(3)) resulted in a very brittle and powdery crystal.

The results suggest that crystallinity of α-lactose monohydrate is improved and that there are more well formed discrete crystals and less amorphous glassy lactose. The improved level of brittleness could possibly be attributed to a more ordered structure which consequently leads to a better cleavage of the crystal in addition to less amorphous glassy lumps within the crystal.

4.2.2 Differential Scanning Calorimetry (DSC)

DSC gives a thermal analysis of the lactose crystals by controlled heating resulting in a melting profile. The results are shown in the following Table where melting temperature in ° C. is stated for each of the three samples for each experiment.

TABLE 4.2.2

| Expt | Sample 1 | Sample 2 | Sample 3 |
|---|---|---|---|
| 1 | 150.9 | 142.6, 152.0 | 139.7, 150.5 |
| 2 | 141.3, 150.8 | 143.2, 152.9 | 143.3, 150.7 |
| 3 | 142.0, 150.0 | 143.0, 151.7 | 145.0, 219.7 |
| 4 | 143.0, 150.5 | 142.7, 151.5 | 144.5, 150.2 |
| 5 | 148.2. 151.8 | 145.0, 150.6 | 141.2, 150.4 |
| 6 | 144.9, 218.2 | 143.0, 150.0 | 143.4, 219.2 |
| 7 | 143.0, 149.9 | 142.9, 216.5 | 143.4, 219.2 |
| 8 | 148.5, 221.2 | 143.8, 150.8, 198.0 | 142.2, 149.7 |
| 9 | 143.2, 148.6 | 141.2, 149.1 | 142.1, 217.7 |

Results from the literature show that α-lactose monohydrate has a melting temperature at about 143° C. and about 147° C. and about 209° C. where decomposition occurs simultaneously with melting and β-lactose has a melting temperature at about 236° C. Most of the experimental results obtained correspond to the melting temperature of α-lactose whilst a few samples produced a higher melting peak at about 219° C. which is indicative of β-lactose. More particularly, most of the experiments showed two melting peaks, one at about 142° C. and the other at about 152° C., indicative of α-lactose. Some of the samples subject to medium permanent field (experiment 3(3)), pulsed field (experiments 6(1) and 6(3)) and DC field (experiments 7(2), 7(3), 8(1), 8(2) and 9(3)) showed a higher melting point at about 219° C. in addition to a melting point at about 140° C. which indicates the presence of β-lactose within the crystal.

These observations can be explained by the mutarotation properties of lactose and more particularly the fact that α-lactose monohydrate mutarotates to form β-lactose until an equilibrium is set up where there is a higher concentration of β-lactose. The sample shows that in some cases β-lactose is crystallized with the α-lactose, since the higher melting points of about 219° C. are measured.

4.2.3 X-Ray Diffraction (XRD)

The characteristic d-spacings of different lactose crystal forms are shown in the following table:

TABLE 4.2.3

| Lactose Structure | Characteristic d-Spacing (A) |
|---|---|
| α-Lactose monohydrate | 4.43, 4.64, 5.39 |
| β-Lactose anhydride | 4.24, 4.63, 8.41 |
| Unstable α-lactose anhydride | 4.13, 4.63, 4.93 |
| Stable α-lactose anhydride | 3.82, 4.21, 4.56 |
| a-Lactose + β-lactose (5:3) | 4.04, 4.42, 4.65 |

Detailed XRD data are not shown but the patterns produced were most likely to be α-lactose monohydrate where the characteristic peaks matched those observed. Characteristic peaks from other lactose structures did not correlate well with observed patterns and this eliminates possibilities that the structure of the crystals found could be of the β-form, α-anhydride or a mixture of both isomers.

Accordingly, with reference to standard crystal forms it could be concluded that all samples appeared to be α-lactose monohydrate.

However, the results did not correlate exactly with literature values where d-spacing values seemed to be either slightly larger or smaller than expected. For example, for experiment 1(1) a d-spacing of 6.91A rather than 7.08A was obtained and for experiment 1(2) a value of 7.23A (again rather than 7.08A) was seen. Other examples were experiment 3(1) where a value of 5.37A was obtained rather than 5.41A and experiment 4(2) where 5.51A was seen rather than the literature value of 5.41A. It should be noted that these variations were seen only for values around the region of 7.08A and 5.41A whereas other results seem to correlate well with the literature values.

The variation in d-spacing could indicate a change in interplanar spacing due to water incorporation into the lactose crystal although in this case the d-spacing would be expected to be consistently larger in all cases rather than fluctuating around the actual value. The possibility of inaccuracy in the powder XRD equipment cannot be ruled out.

4.2.4 Scanning Electron Microscopy (SEM) The lactose solution crystallized at two different interfaces, these being:

solution/glass where the lactose solution was in contact with the Petri dish solution/air where the lactose solution was in contact with the air and is generally amorphous.

These regions were examined as was a third region:

crystals of solution where the lactose solution crystallized in between the two interfaces. Individual SEMs are not shown.

4.2.4.1 Solution/Glass Interface

In all cases where crystallization had occurred in a magnetic field the solution/glass interface had less amorphous material and was more defined and angular compared to the controls.

Experiment 1 consisted of flaky layers of chunky crystals where the surface appeared to be quite textured. Experiment 2: showed crystals to be longer, flatter and more crystalline than those seen in experiment 1, growing in the direction of the field lines. The crystals seen in experiment 4 were well defined with angular shapes and had a reduction in the amorphous material surrounding them compared to the controls. Experiment 5 produced "chunky" crystals with large flat surfaces and the growth appeared to be almost layered. More defined, discrete, flat, angular shaped crystals were seen in experiment 7 and in addition more flaky layers and less amorphous material was seen when compared to the controls. Experiments 8 and 9 showed similar, results to those seen in experiment 7.

4.2.4.2 Solution/Air Interface

The solution/air interface shows more crystalline, fibrous material in all magnetic fields compared to the control which is almost amorphous with crystalline regions.

Experiment 1 showed the amorphous material to have some form in the shape of fans. Less amorphous material was seen in experiment 2, indicated by more crystalline regions on the surface. Experiment 6 produced long, fibre-like formation on the surface and compared to the control the samples had definite texture and well formed fibrous crystals. Ordered chunks on the surface pointing in a similar direction on an elongated axis were observed in experiment 7 and the surface was not amorphous like the controls. Experiment 8 showed crystals having long fan like projections and appearing to be fibrous. Non-amorphous but needle-like or fibrous crystals were seen in experiment 9.

4.2.4.3 Crystals of Solution

Elongated, plate-like crystals were observed in the solution crystals in all magnetic field samples, particularly with DC fields. Experiment 1 showed crystals having a regular, cuboid shape with flat surfaces and angled corners, coated with amorphous material. Experiment 2 produced crystals less defined than the controls having rounded corners covered with amorphous material. Well defined and angular shapes with predominating layers were seen in experiment 4 and there also appeared to be less amorphous material than seen in the controls. Experiment 6 showed crystals to be better formed with flatter and more angled surfaces than those seen in the controls. Experiment 7 produced crystals that were longer and more layered with less amorphous material then the controls. Experiments 8 and 9 showed layer formation again with elongated and well formed crystals.

Generally a more defined crystal with less amorphous coating was produced when solutions were crystallized under the influence of a magnetic field. In addition very prominent layer formation of elongated crystals was observed in the samples crystallized under applied fields compared to the more random formation of crystals seen in the control experiments.

4.2.5 Karl Fischer Titrations (KF)

The expected moisture content of α-lactose monohydrate is 4.9997%. Each sample was titrated three times and the mean wt/wt and standard deviations recorded. Data for individual samples are not shown.

Experiment 1 (control) showed mean values from 5.34% to 5.42% with a standard deviation of ±0.10%. If the mean wt/wt percentages (considering standard deviation) were within this range then the results for moisture content would not be regarded as significantly different. A general rule of thumb is to extend the limits to two standard deviations.

Results from the titrations show that samples crystallized in DC fields have an increase in moisture content of around 7.5 to 11% wt/wt compared to the controls and permanent fields (above and below) show an increase in moisture content of about 7% wt/wt. Other samples did not have a significantly higher moisture content.

In addition to the measurement of additional water within the lactose molecule, these results confirm the powder XRD results that the a-monohydrate crystal form is obtained in all cases.

4.2.6 Conclusions

It is clear that magnetic fields affect the crystallization of lactose and a summary of all the results is shown in the following Table 4.2.6. Powder XRD and KF titrations show that the crystal form is not altered by applied fields and remains the α-lactose monohydrate. Crystallinity of the lactose crystal increased, i.e. a well formed, more brittle and powdery crystal was produced when the lactose solution was subject to magnetic fields during crystallization. SEM results showed the formation of layers and different morphology where crystals were seen to be more elongated and regular rather than being uneven blocks as seen in controls. The amorphous content of the crystals was seen to decrease when a magnetic field was applied. Karl Fischer titrations indicate additional water in the lactose crystal when subject to magnetic fields. The water may be strongly bound in the crystal lattice or weakly bound as water inclusions. Powder XRD did not rule out any of these possibilities.

TABLE 4.2.6

| | DSC (° C.) | XRD | SEM | Icy |
|---|---|---|---|---|
| 1(1) | 150.9 | α-l'ose m'hyd | Solution/glass-chunky Crystals with flaky layers Solution/air-amorphous surface some form in the shape of fans Crystals of solution-regular, flat surfaces with angled corners with amorphous coating | 5.395 |
| 1(2) | 142.6,152.0 | α-1'ose m'hyd | | |
| 1(3) | 139.7,150.5 | α-l'ose m'hyd | | |
| 2(1) | 141.3,150.8 | α-l'ose m'hyd | Solution/glass-longer crystals seen Solution/air-less amorphous material on the surface compared to controls Crystals of solution-crystals have less form than controls | 5.411 |
| 2(2) | 143.2,152.9 | α-l'ose m'hyd | | |
| 2(3) | 143.3,150.7 | α-lose m'hyd | | |
| 3(1) | 142.0,150.0 | α-l'ose m'hyd | Solution/glass-discrete, well-formed crystals with amorphous material between Solution/air-similar to 2 (2) Crystals of solution-well defined crystals with some amorphous material | 5.674 |
| 3(2) | 143.0,151.7 | α-l'ose m'hyd | | |
| 3(3) | 145.0,219.7 | α-l'ose m'hyd | | |
| 4(1) | 143.0,150.5 | α-l'ose m'hyd | Solution/glass well-formed angular crystals with significantly less amorphous material Solution/air-similar to 2 (2) Crystals of solution-well formed, with angular shapes, with predominating layers | 5.532 |
| 4(2) | 142.7,151.5 | α-l'ose m'hyd | | |
| 4(3) | 144.5,150.2 | α-l'ose m'hyd | | |
| 5(1) | 148.2,151.8 | α-l'ose m'hyd | Solution/glass-an almost layered growth Solution/air-some amorphous material on the surface Crystals of solution-well formed crystals with some amorphous material | 5.758 |
| 5(2) | 145.0,150.6 | α-l'ose m'hyd | | |
| 5(3) | 141.2,150.4 | α-l'ose m'hyd | | |
| 6(1) | 144.9,218.2 | α-l'ose m'hyd | Solution/glass-regular formed, angular crystals with flat surfaces Solution/air-very fibrous surface seen Crystals of solution-well formed, flat, angled surfaces, with some layers | 5.634 |
| 6(2) | 143.0,150.0 | α-l'ose m'hyd | | |
| 6(3) | 143.4,219.2 | α-l'ose m'hyd | | |
| 7(1) | 143.0,149.9 | α-l'ose m'hyd | Solution/glass-discrete, well formed crystals with flaky layers of material Solution/air-ordered chunks, with growth in one direction on an | 5.813 |
| 7(2) | 142.9,216.5 | α-l'ose m'hyd | | |
| 7(3) | 143.4,219.2 | α-l'ose m'hyd | | |

TABLE 4.2.6-continued

| DSC (° C.) | XRD | SEM | Icy |
|---|---|---|---|
| | | elongated axis - not amorphous | |
| | | Crystals of solution-very layered, with elongated shapes, little amorphous | |
| 8(1) 148.5,211.2 | α-l'ose m'hyd | Solution/glass-well formed, flat, angular crystals - very little amorphous material | 5.868 |
| 8(2) 143.8,150.8 198.0 | α-l'ose m'hyd | | |
| 8(3) 142.2, 149.7 | α-l'ose m'hyd | Solution/air-fibrous, fan-like projections - no longer amorphous | |
| | | Crystals of solution-well formed, discrete, layered crystal | |
| 9(1) 143.2,148.6 | α-l'ose m'hyd | Solution/glass-well formed, angular crystals with little amorphous material | 6.092 |
| 9(2) 141.2,149.1 | α-l'ose m'hyd | | |
| 9(3) 142.1,217.7 | α-l'ose m'hyd | Solution/air-crystalline, needle-like layers seen - not amorphous | |
| | | Crystals of solution-elongated, well defined crystals with layer formation | |

KF = Karl Fischer titration (% wt/wt)
α-l'ose m'hyd = α-lactose monohydrate

5. Production of Milk Chocolate

The following (headed "Old Recipe") is a recipe for milk chocolate based on Jackson in "Industrial Chocolate Manufacture and Use", Blackies, 1988, page 254, Table 13.5 together with a modified recipe (headed "With Sucrose Hydrate") to take account of the use of sucrose hydrate containing 10% water:

| Percentage Composition | Old Recipe | With Sucrose Hydrate |
|---|---|---|
| Cocoa Mass | 12 | 11.4 |
| Milk Powder | 14 | 13.3 |
| Sugar | 52.25 | 49.8 |
| Add Cocoa Butter | 21.35 | 20.3 |
| Lecithin | 0.3 | 0.3 |
| Water in Hydrate | | 5.0 |
| Calories/g (calculated) | 5.5 | 5.2 |

The chocolate can be manufactured using conventional methods, for example as set out in the reference mentioned above. The figures for calories/gram are calculated on the basis of fat=9 cal/g, carbohydrate and protein=4 cal/g and assuming about 2.5% fibre.

What is claimed is:

1. A process for preparing crystalline sugar, the process comprising:
   providing a solution comprising about 20 to 40% sugar and about 80 to 60% solvent based on the total weight of the solution;
   exposing the solution to a magnetic field having a strength of between about 30 and 760 G which magnetic field strength is sufficient to influence at least one of morphology, size, nucleation rate, or crystallinity of the resulting crystalline sugar product; and
   providing conditions suitable for crystallization to obtain a substantially crystalline sugar product with fewer centers of nucleation.

2. The process of claim 1 wherein the sugar is sucrose, glucose, fructose, lactose, trehalose, sorbitol, mannitol, erythritol, or a combination thereof.

3. The process of claim 1 wherein the solvent is water and the crystalline sugar product comprises sucrose hydrate.

4. The process of claim 1 wherein the crystalline sugar product comprises at least about 1% water by weight.

5. The process of claim 1 wherein the solvent is water, the solution is from about 10 to 30% unsaturated, and the magnetic field is applied when no seed crystals are present.

6. The process of claim 5 wherein the solution comprises from about 20 to 40% sucrose and about 80 to 60% water based on the total weight of the solution and the temperature during at least a portion of the crystallization is from about 35 to 65° C.

7. The process of claim 1 wherein the sugar consists essentially of lactose and the solvent is water.

8. The process of claim 1 wherein at least a portion of the solution is exposed to a magnetic field from at least one DC electromagnet during the exposing step, the magnet providing a magnetic field strength of at least about 50 to 600 G.

9. The process of claim 1 wherein the magnetic field is applied using at least one pulsed magnet.

10. The process of claim 1 which further comprises maintaining at least a portion of the solution at a temperature of from about 30 to about 70° C. during at least a portion of the crystallization step.

11. A process of preparing a food or confectionery product which comprises preparing a substantially crystalline product according to claim 1 and utilizing the substantially crystalline sugar product as an ingredient in or a coating on the food or confectionery product.

12. A crystalline sugar product prepared by the process of claim 1 and having a water content of at least 1% by weight.

13. The crystalline sugar product of claim 12 in the form of sucrose hydrate optionally in combination with anhydrous sucrose.

14. The crystalline sugar product of claim 12 in the form of crystalline lactose.

15. A food or confectionary product prepared with the crystalline sugar product of claim 12.

16. The food or confectionary product of claim 15 further comprising chocolate.

17. The food or confectionary product of claim 15 wherein the crystalline sugar product is present in the form of a coating.

18. The process of claim 1, wherein at least a portion of the solution is exposed to the magnetic field while evaporating an amount of solvent sufficient to cause crystallization of the sugar.

* * * * *